United States Patent [19]
Beakes et al.

[11] Patent Number: 5,370,324
[45] Date of Patent: Dec. 6, 1994

[54] STATOR WINDING METHOD AND APPARATUS

[75] Inventors: John M. Beakes, Fairborn; Gary E. Clemenz, Bellbrook; Patrick A. Dolgas, Milford; Mark T. Heaton, Springfield; Lawrence E. Newman, Tipp City, all of Ohio

[73] Assignee: Globe Products Inc., Huber Heights, Ohio

[21] Appl. No.: 148,175

[22] Filed: Nov. 5, 1993

Related U.S. Application Data

[63] Continuation of Ser. No. 587,937, Sep. 25, 1990, abandoned.

[51] Int. Cl.⁵ ............................................ H02K 15/02
[52] U.S. Cl. .................................... 242/1.1 R; 29/596
[58] Field of Search ............. 242/1.1 R, 1.1 A, 1.1 E; 29/596, 605

[56] References Cited

U.S. PATENT DOCUMENTS

| | | | |
|---|---|---|---|
| 3,580,090 | 5/1971 | Bondarenko | 242/1.1 R |
| 3,812,570 | 5/1974 | Mason | 29/205 D |
| 3,881,238 | 5/1975 | Mason | 29/205 D |
| 3,903,593 | 9/1975 | Mason | 242/1.1 R |
| 4,000,764 | 1/1977 | Reiger, Jr. | 140/113 |
| 4,074,418 | 2/1978 | Pearsall | 29/596 |
| 4,158,314 | 6/1979 | Finegold | 74/23 |
| 4,732,338 | 3/1988 | Eminger et al. | 242/1.1 R |
| 4,762,283 | 8/1988 | Sabatino | 242/1.1 R |
| 4,844,356 | 7/1989 | Koizumi | 242/1.1 R |
| 4,913,362 | 4/1990 | Koizumi | 242/1.1 R |
| 4,946,111 | 8/1990 | Luciani | 242/1.1 R |
| 4,951,379 | 8/1990 | Clemenz | 29/597 |
| 4,969,606 | 11/1990 | Santandrea et al. | 242/1.1 R |
| 4,982,908 | 1/1991 | Luciani | 242/1.1 R |
| 4,997,138 | 3/1991 | Luciani et al. | 242/7.03 |
| 5,207,745 | 5/1993 | Santandrea | 242/1.1 R |

FOREIGN PATENT DOCUMENTS

0331906 2/1989 European Pat. Off. .
91308740 6/1993 European Pat. Off. .

OTHER PUBLICATIONS

Page from Brochure Titled "Globe Automated Stator Assembly" Showing HSWTAC-3100 Stator Winder Published 1986 by Statomat-Globe, Inc. Front and Back Cover Pages Included.
Two Photographs of Prior Art Machine.

*Primary Examiner*—Katherine Matecki
*Attorney, Agent, or Firm*—Roger S. Dybvig

[57] ABSTRACT

A stator winding machine has a turret plate mounted for rotation about a vertical axis with stator clamp mechanisms mounted at spaced locations around its periphery for clamping stators to the turret plate with the axes of the stators coplanar with the axis of reciprocation and oscillation of the winding shuttle used to wind coils on the stators. The turret plate is repeatedly indexed in one direction about its vertical center axis to repeatedly sequentially move each of the stator clamp mechanisms to a load/unload station, an optional idle station, a winding station, a coil lead terminating station, and then back to the load/unload station. Parts of the machine are quickly replaceable and other parts are programmably adjustable to accommodate different stator configurations.

4 Claims, 7 Drawing Sheets

STATOR WINDING METHOD AND APPARATUS

This is a continuation of copending application Ser. No. 07/587,937 filed on Sep. 25, 1990, now abandoned.

BACKGROUND OF THE INVENTION

This invention relates to a stator winding method and apparatus and particularly to a machine for winding field coils on dynamoelectric devices and particularly 2-pole stators and for effecting a connection between the field coils and terminals mounted on the stator.

An object of this invention is to provide a machine which has a high production rate, which is readily adaptable for use with industrial robots and conveyors that convey stators to and from the machine, and is readily changed over, by the use of both programmably adjustable parts and readily replaceable parts, from the winding of a stator of one configuration to the winding of stators having different configurations.

In accordance with this invention, a stator winding machine is provided having a turret plate mounted for rotation about a vertical axis extending centrally therethrough, and plural stator clamp mechanisms mounted at spaced locations around the periphery of the turret plate, each of which mechanisms clamps a stator to the turret plate. For reasons which will become apparent, each stator is clamped to the turret plate with its center extending horizontally and substantially perpendicularly with respect to the vertical axis of rotation of the turret member and with the end face of the stator most remote from the vertical axis of the turret plate held in a vertical orientation spaced a fixed horizontal distance from such vertical axis. The stator is positioned on a seat adjacent each of the clamp mechanisms which may include a replaceable spacer for positioning the clamped stators at a proper height.

A wire clamp assembly is mounted on the turret plate adjacent each of the stator clamp mechanisms. Each wire clamp assembly preferably has programmable, air operated wire clamps adapted to temporarily hold coil lead wires extending from coils wound on a stator being wound.

The turret member is repeatedly indexed in one direction about its vertical center axis to repeatedly sequentially move each of the stator clamp mechanisms to a load/unload station, a winding station, a coil lead terminating station, and then back to the load/unload station. In the presently preferred embodiment, the turret has four stator clamp mechanisms, located 90 degrees apart around the periphery of the turret plate, one for each of the above-mentioned stations and an additional one which is accommodated by an idle station between the load/unload station and the winding station.

At the load/unload station, a newly wound stator is removed from the turret plate and replaced by an unwound stator. Subsequently, the unwound stator is moved by an index of the turret plate to the winding station. Located adjacent the winding station is a winding head having a winding shuttle or ram that reciprocates and oscillates about a fixed horizontal axis to draw two or more wires from sources of wire under tension to wind the wires into coils about the stator poles. In advance of the operation of the winding head, two pairs of winding forms are connected to the unwound stator at the winding station, and a pair of wires extending from the wire sources and held by wire grippers are inserted by movement of the wire grippers into a pair of the wire clamps supported on the turret plate. Coils of wire are then wound on the unwound stator by operation of the winding head. At the conclusion of the winding operation, the wire portions leading from the coils to the winding shuttle are gripped by the wire grippers to form coil finish lead wires extending from the coils, which are positioned in other wire clamps on the turret plate. Wire cutting mechanisms associated with the wire grippers cut the finish leads now clamped to the turret plate, free from the wire grippers so that the newly wound stator is completely severed from the winding head. The stator may then be indexed by rotation of the turret plate to the wire terminating station at which the start and finish leads are removed from the wire clamps and at least temporarily connected to terminals on the stator by a robot or other suitable mechanism. Accordingly, when the newly wound stator arrives at the load/unload station, it may be simply unclamped from the turret plate and removed. The foregoing operations are repeated to continuously wind stators.

Preferably in accordance with this invention, the stator clamp mechanisms and the stator seats and spacers are quickly replaceable to accommodate stators having different stack diameters, the winding form handling and locking mechanisms are capable of accommodating stators having different stack heights, the winding head is programmably movable for accommodating stators having different stack heights, and the wire grippers form parts of a lead pull assembly which is programmable to accommodate different requirements for stator coil leads, both as to the position of the wire clamps for the start and finish wires and also as to any wire clamps that may be provided for coil tap leads.

Other objects and advantages will become apparent from the following description and the drawings.

DETAILED DESCRIPTION

Figure 1:
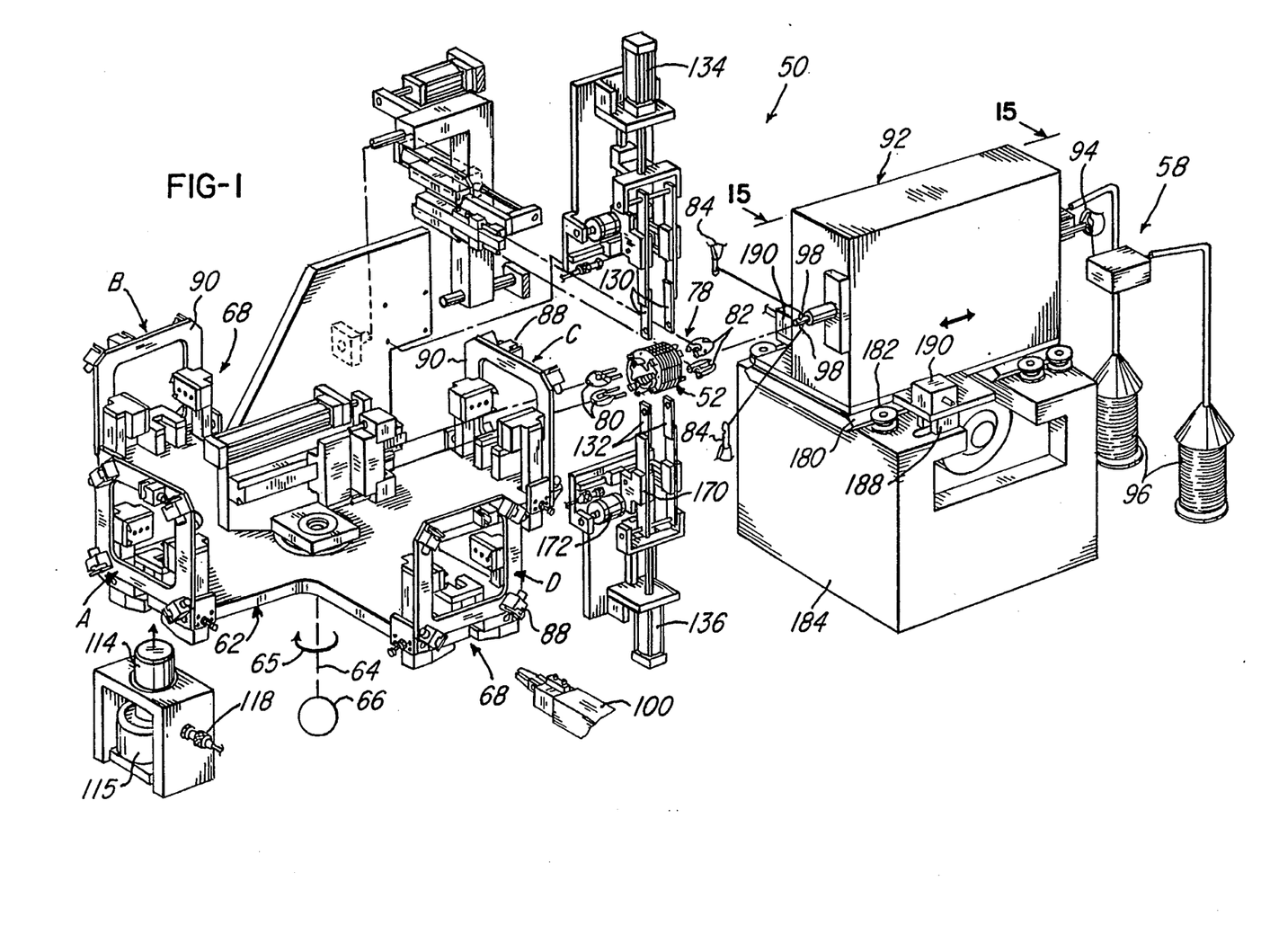
FIG. 1 is a simplified, exploded, partly diagrammatic perspective view of a stator winding machine in accordance with this invention.
Figures 2, 8, 9:
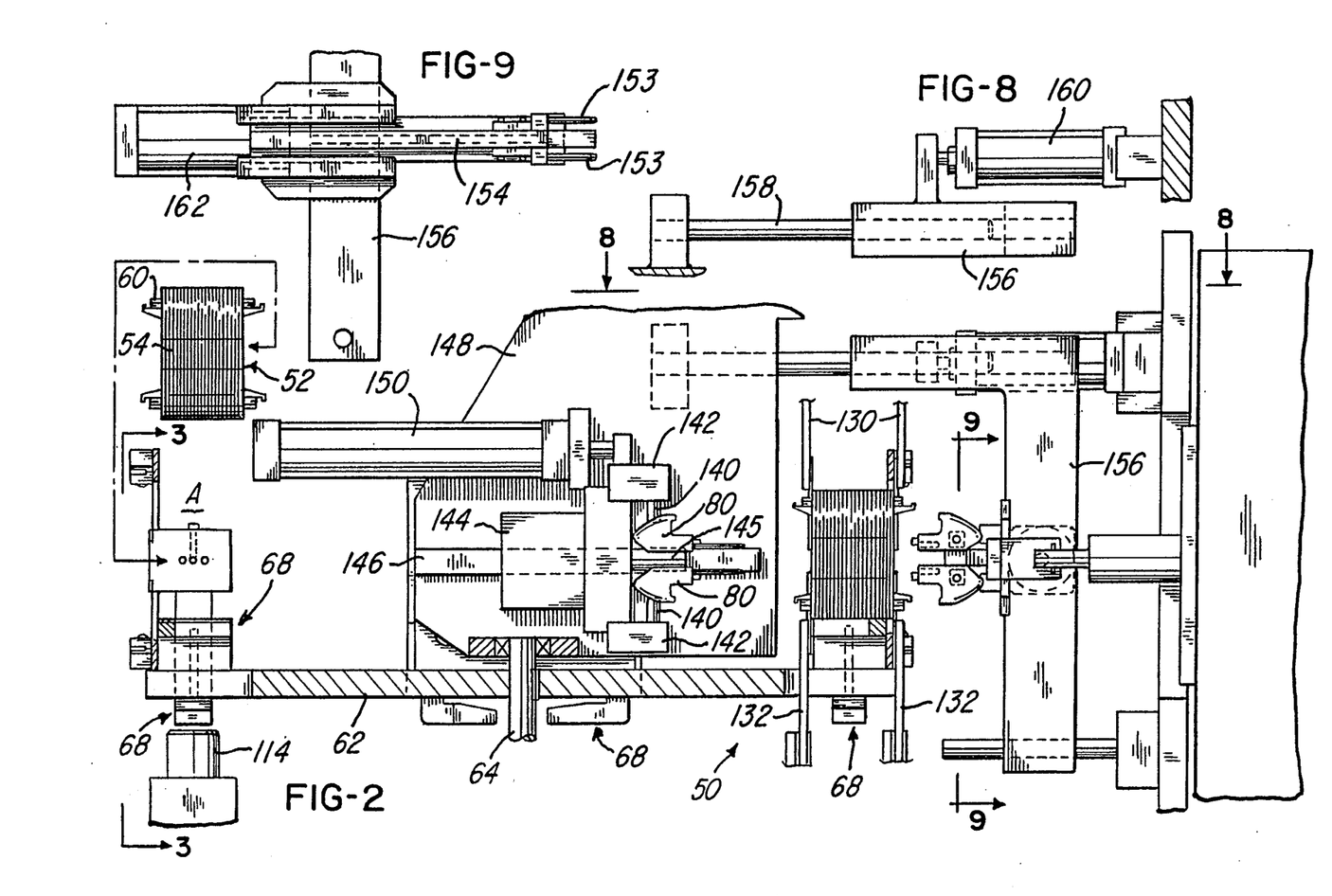
FIG. 2 is a simplified, fragmentary, front elevational view of the machine of FIG. 1 and showing an unwound stator in position to have coils wound therein and another unwound stator about to be clamped to the machine turret plate.
FIG. 8 is a fragmentary top plan view, partly in cross-section, of a portion of a winding form-loading mechanism of the machine of FIGS. 1 and 2 as viewed in the direction of arrows 8—8 of FIG. 2.
FIG. 9 is a fragmentary elevational view of another portion of the winding form-loading mechanism of the machine of FIGS. 1 and 2 as viewed in the direction of arrows 9—9 of FIG. 2.

FIGS. 1 and 2 illustrate a stator winding machine, generally designated 50, in accordance with this invention for use in winding coils of wire onto a 2-pole stator, generally designated 52, comprising a generally cylindrical laminated core 54 that forms pole pieces 56 about which the coils are wound from wires drawn from sources 58 of wire under tension. Here it may be observed that the length of a stator is known as its "stack height" since its length is determined by the number and thickness of the laminations from which it is formed. Its outer diameter is termed its "stack diameter". The stator 52 is also provided with terminal boards, which may be entirely conventional, and terminals 60 held by the boards to which the stator coil lead wires are connected.

In general, the purpose of the stator winding machine 50 is to wind field coils onto the stator pole pieces 56 and to at least temporarily connect the coil lead wires to the terminals on the stator.

With continued reference to FIGS. 1 and 2, the machine 50 includes a turret plate 62 mounted for rotation about a vertical axis 64 and repeatedly rotationally indexed through successive 90 degree increments in one direction, as indicated by the arrow 65 in FIG. 1, about its vertical axis 64 by a suitable indexing drive motor 66.

Stators to be wound are clamped to an individual one of four stator clamp mechanisms, generally designated 68, each of which includes a pair of mutually confronting stator clamps, generally designated 70, pivotally mounted on the periphery of the turret plate 62 and biased by springs 72 into clamping engagement with the stators clamped thereby. The stators are supported by seats 74 located around the periphery of the turret plate 62. Spacers 76 to which the seats 74 are connected in any suitable fashion are provided, if needed, to locate the stators at the proper height with the longitudinal axis of the stator coplanar with the horizontal axis of movement of the winding shuttle, as will become apparent.

The four stator clamp mechanisms 68 are connected to the turret plate 62 at 90 degree spaced location so that, in operation, after each 90 degree index of the turret plate 62, there will be a clamp mechanism 68 at each of four stations, namely a load/unload station A, an idle station B, a winding station C, and a coil lead terminating station D. At each of the stations, the stators are positioned with their center axes extending horizontally and substantially perpendicularly with respect to the vertical axis 64 of the turret plate 62 and with the end faces of the stators most remote from the vertical axis 64 in vertical orientations and spaced a fixed horizontal distance from the vertical axis 64 of the turret plate 62.

At the load/unload station A, a newly wound stator 52 is unclamped from the turret plate 62, removed from the turret plate 62, and replaced by an unwound stator 52. No operations are performed on the stator at the idle station B. At the winding station C, two pairs of winding forms 78, namely a pair of upper and lower front winding forms 80 and a pair of upper and lower rear winding forms 82, are connected to the unwound stator 52, and wire portions held by an upper and lower pair of wire grippers 84 are inserted by movement of the wire grippers 84 into a pair of the wire clamps 88 supported on the turret plate 62 by a mounting frame plate 90, as will be further described below.

After the foregoing steps are accomplished, a pair of stator coils are wound by the operation of a winding head 92 located adjacent the winding station C and having a reciprocating and oscillating shuttle or ram 94 that draws wires from sources 96 of wire under tension and having wire guide needles 98 through which the wires exit as the coils are wound. The operating mechanism within the winding head may be entirely conventional so it is not described in detail herein, its importance being that it causes the winding shuttle or ram 94 to reciprocate and oscillate about a fixed horizontal axis in order to wind coils of wire around the stator pole pieces in a manner well known in the art.

At the conclusion of the winding operation, the wire portions leading from the coils to the winding shuttle 94 are gripped by the wire grippers 84 to form coil finish lead wires extending from the coils, which are positioned in other ones of the wire clamps 88. Wire cutting mechanisms associated with the wire grippers 84 cut the finish leads free from the wire grippers so that the newly wound stator is completely free from the winding head shuttle 94 so that it may be indexed by rotation of the turret plate 62 to the wire terminating station D at which the start and finish leads are removed from the wire clamps 88 and at least temporarily connected to terminals on the stator by a robot or other suitable mechanism, diagrammatically indicated at 100. This mechanism may also be conventional and is not further described herein. One example of a coil terminating mechanism is shown in U.S. Pat. No. 4,951,379. Thus it may be seen that when the newly wound stator returns to the load/unload station A, it may be simply unclamped from the turret plate and removed. The foregoing operations are repeated to continuously wind stators.

With reference to FIGS. 1 through 6, each clamp mounting plate 90 comprises a rectangular plate connected to a pair of spring retainer plates 102, each of which is mounted on the turret plate 62 over a recess 104 therein which is spanned by a pivot pin 106 for an L-shaped clamp lever 108 that forms part of one of the stator clamps 70. Each clamp 70 further includes a clamp jaw 110 removably connected to the clamp lever 108 shaped to engage the outer periphery of the stator. Each clamp jaw 110 has a pair of protuberant teeth 112 having vertical surfaces which provide reference points or backup surfaces engaged by the face of the stator most remote from the vertical axis 64 to insure that the stator is properly spaced from the operating mechanisms at the various stations. The stator may be so positioned by hand or by the use of a suitable mechanism, such as an industrial robot (not shown). To enable the stator to be inserted and removed through the clamp mounting plate 90 at the load/unload station A, the clamp jaws are spread apart by engagement of the piston 114 of an air cylinder 115 with the lower leg of the L-shaped clamp lever 108, as apparent from an inspection of FIGS. 1-3. A sensing switch 118 (FIG. 1) indicates to the machine controls that it is safe to index. The operations of this and various other sensing devices are not described herein, the use of such devices in the control of machine operations being well known.

Figure 3:
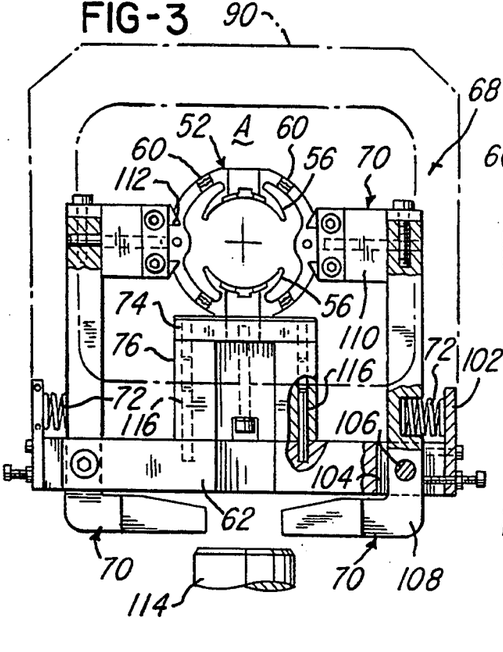
FIG. 3 is a fragmentary elevational view, with parts broken away and parts shown in cross section, of a stator support and clamp assembly forming part of the machine of FIG. 1 as viewed in the direction of arrows 3—3 of FIG. 2 and showing a wire clamp support holder associated therewith by broken lines.
Figure 4:
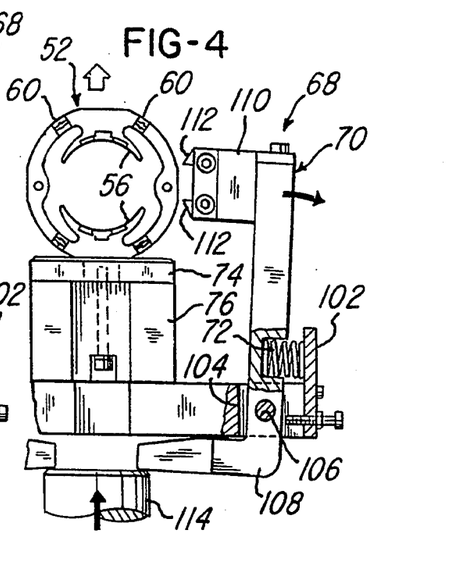
FIG. 4 is a fragmentary elevational view, with parts broken away and parts shown in cross section, of a portion of the stator support and clamp assembly of FIG. 3.
Figures 5, 6, 7:
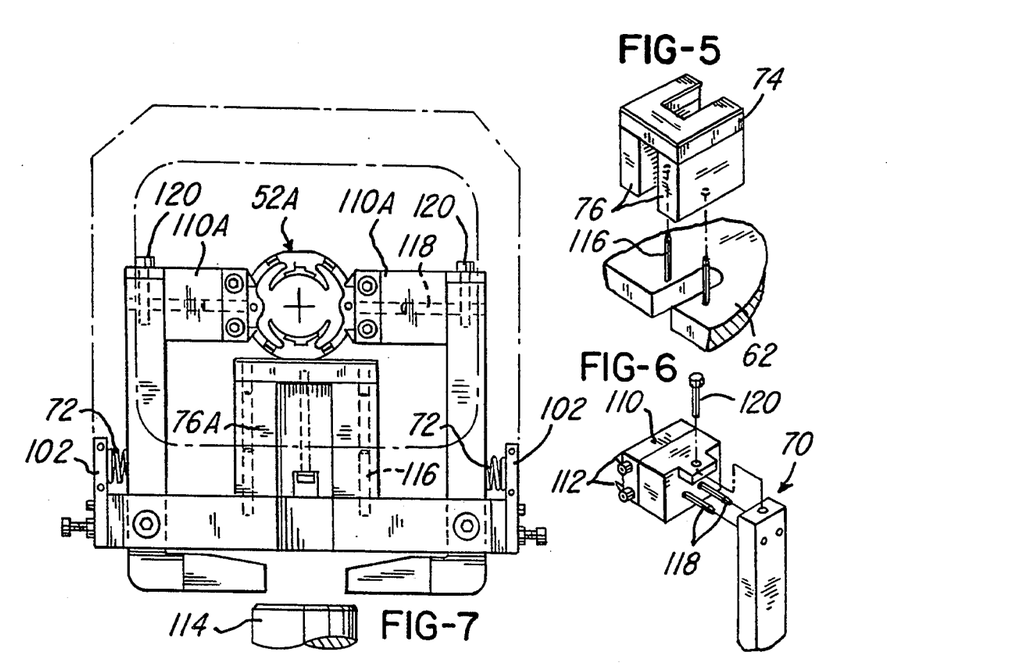
FIG. 5 is a fragmentary, exploded perspective view of a portion of a stator support forming part of the support and clamp assembly of FIGS. 3 and 4.
FIG. 6 is a fragmentary, exploded perspective view of a portion of a stator clamp forming part of the support and clamp assembly of FIGS. 3 and 4.
FIG. 7 is a view similar to FIG. 3 showing the stator support and clamp assembly modified to support a stator of a different size.

As seen in FIGS. 5 and 6, the assembled seats 74 and spacers 76 and the stator clamp jaws 110 are readily removable and replaceable for use in supporting stators having different stack diameters. Thus, an assembled seat 74 and spacer 76 can simply be lifted off the turzet plate 62, it being held only by a pair of pins 116 on the turret. The stator clamp jaw 110 shown in FIG. 6 is similarly slidable off the clamp lever 108 following removal of a retaining pin 120. The advantage of these quick-change parts can be observed by a comparison 0f FIGS. 3 and 7. Thus, FIG. 3, shows a relatively larger stator 52 and FIG. 7 shows a relatively smaller stator, designated 52A. FIG. 7 accordingly has a correspondingly taller spacer, designated 76A, and longer clamp jaws, designated 110A. It will be noted in FIGS. 3 and 7 the stators are located on the same center line.

The winding of an unwound stator 52 commences with placement of the stator on the seat 74 located at the load/unload station A. This .places the stator in a proper rotational orientation for further processing in view of the fact that the stator has a flat surface which rests on the seat 74. Of course, other means of stator orientation could be used. After the second subsequent index of the turret plate 62, the unwound stator arrives at the winding station C with its center line aligned with the fixed axis of reciprocation and oscillation of the winding shuttle 94. At this time the winding forms 80 and 82 are locked to one another and to the stator core 54 in an essentially conventional fashion. Thus, an upper pair of form retainer blades 130 are moved downwardly and a lower pair of form retainer blades 132 are moved upwardly by the operation of air actuators 134 and 136, respectively, into straddling relation to the stator core 54. It is appropriate to note at this time that the stator seat 74 and its spacer 76 are shaped to permit the extension of the lower form retainer blades therethrough or therepast.

Figure 10:
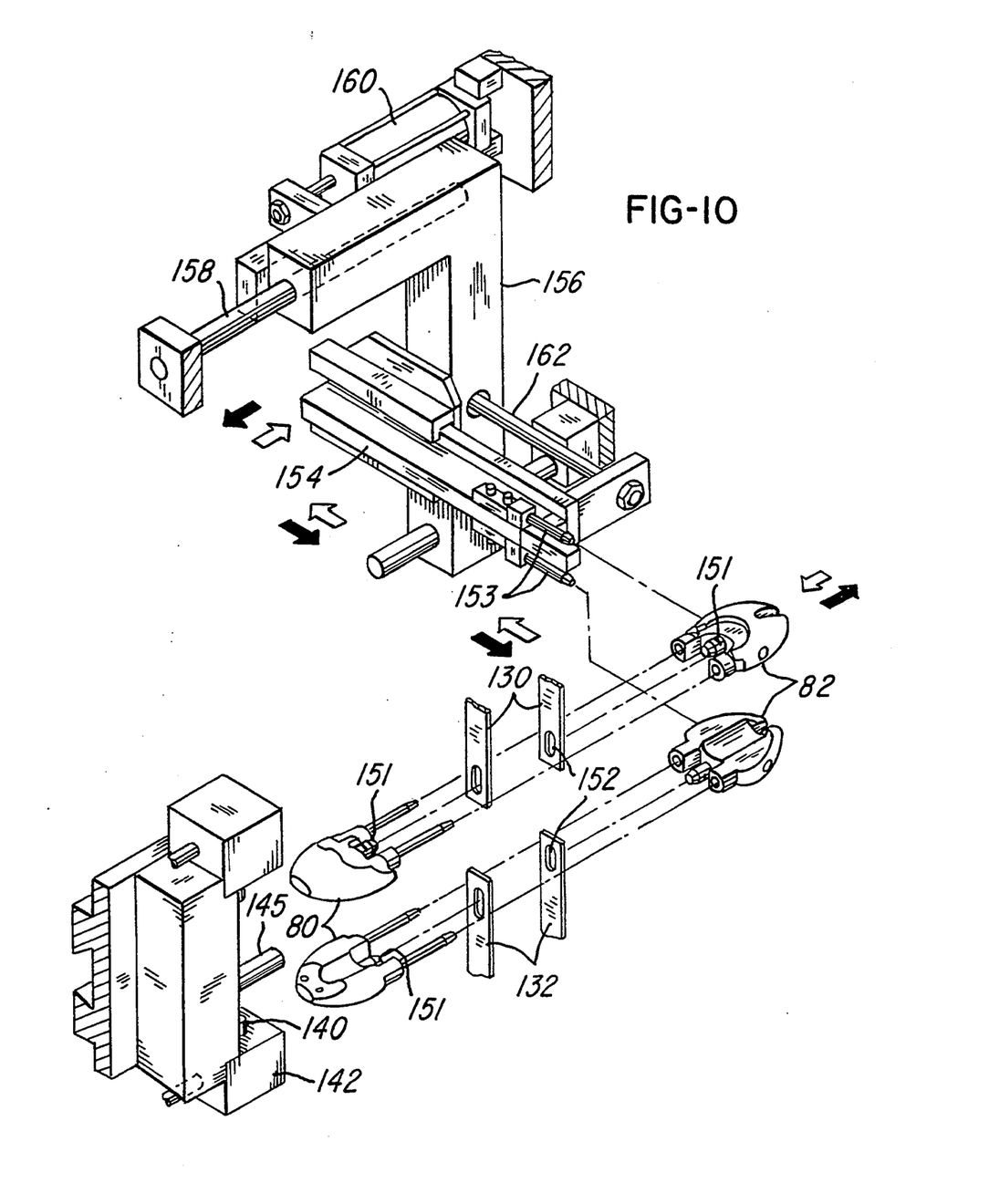
FIG. 10 is a simplified, fragmentary, exploded, perspective view that diagrammatically illustrates the movements of the various parts of the winding form-loading mechanism. The stator is not shown in FIG. 10 to avoid a confusion of lines.

With reference to FIGS. 2 and 10, the front pair of winding forms 80 are initially held between short piston rods 140 controlled by air cylinders 142 mounted on a carriage 144 and a center post 145 on the carriage 144. The carriage 144 is slidably guided along a gib 146 mounted on a mounting plate 148 affixed to the bed of the machine. The carriage 144 is movable toward and away from the stator at the winding station C by operation of an air actuator 150 that is also mounted on the fixed mounting plate 148. Advancement of the carriage 144 toward the stator causes the the front winding forms to engage the front face of the stator core at which time a locking pin 151 on the front winding forms 80 pass through slots 152 in the form retainer blades 130 and 132. The rear pair of winding forms 82 is then advanced toward the stator and interengages with the front winding forms 80. The form retainer blades 130 and 132 are then moved away from the axis of the stator to lock the winding forms 80 and 82 to the stator core 54 by engagement with the locking pins, as well known.

The parts that carry the winding forms 80 and 82 to the stator are now moved away to enable the coil lead connection and the coil winding operations to commence. The carriage 144 for the front winding forms is simply retracted out of the way by operation of the air actuator 150. With reference to FIGS. 8, 9, and 10, the rear winding forms are carried by support pins 153 mounted on a pin carriage 154 movably mounted on an L-shaped bracket 156 slidable on guide rod 158 in a direction generally parallel to the sator axis and moved therealong by an actuator 160. The pin carriage 154 is driven relative to the bracket 156 by an air actuator 162 thereon. In operation, the support pins 153 are advanced to bring the rear winding forms toward the stator by operation of the air actuator 160. After the forms are locked to the stator, the pin carriage is retracted to the side by operation of the air actuator 162 and then rearwardly by operation of the air actuator 160 where the parts are out of the way to permit the coil lead handling and winding operations to take place. The operations to remove the winding forms 80 and 82 after the winding operation is completed will be obvious from the foregoing.

Figures 11, 12, 13, 14:
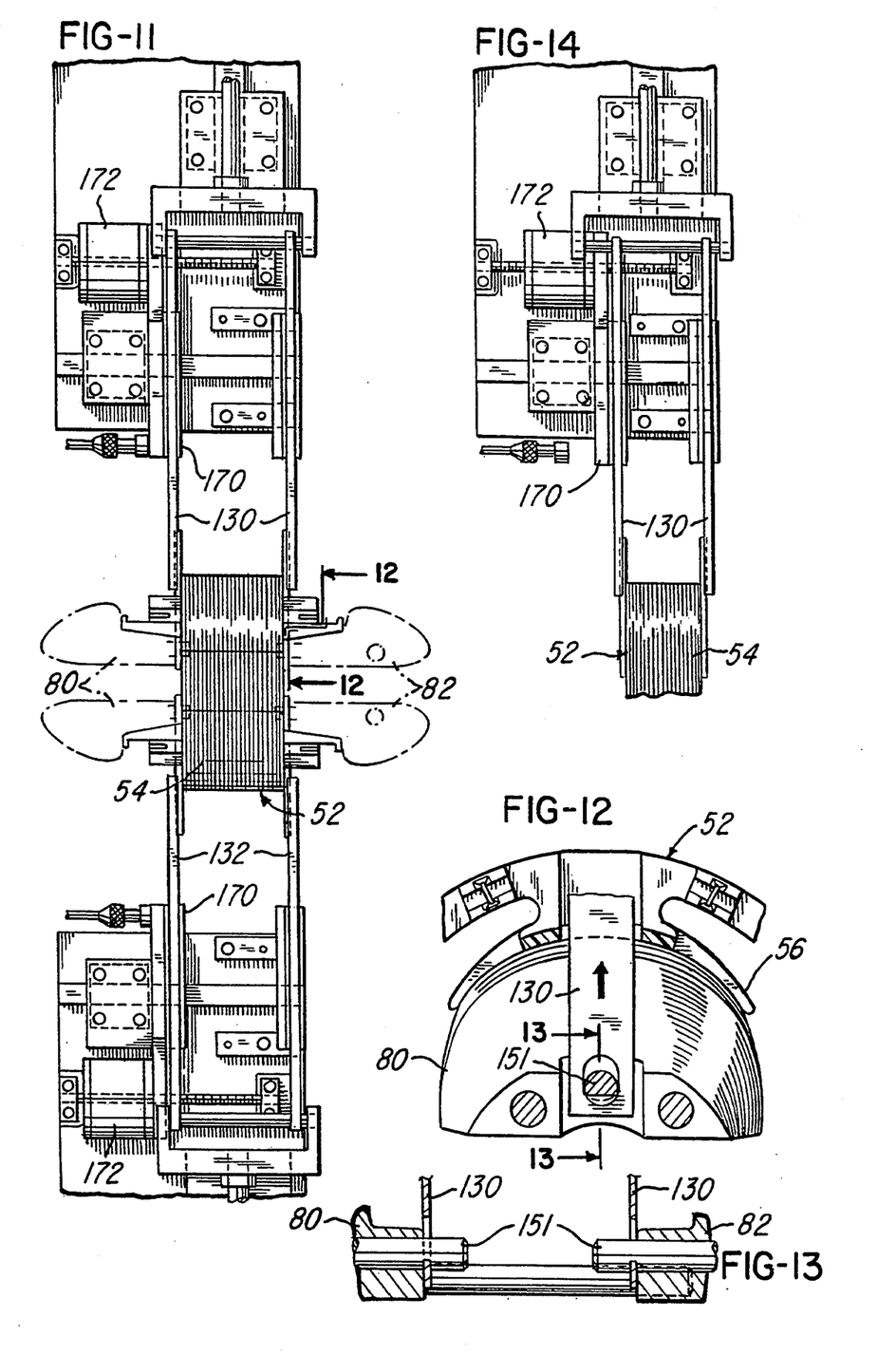
FIG. 11 is a fragmentary, elevational view of a stator located in position to be wound and showing winding forms locked to the stator by upper and lower programmably adjustable form lock assemblies in accordance with this invention.
FIG. 12 is an enlarged, fragmentary cross sectional view taken along section line 12—12 of FIG. 11, with parts cut away, showing the manner in which a winding form is locked to a stator.
FIG. 13 is a fragmentary cross sectional view taken along section line 13—13 of FIG. 12 and on the same scale as FIG. 12.
FIG. 14 is a simplified, fragmentary, elevational view showing the upper form locking assembly adjusted for use with a stator having a different stack height.

With reference to FIGS. 1, 11, and 14, further in accordance with this invention, the frontmost ones of the upper and lower form locking blades 130 and 132 are mounted on movable carriages 170 driven by motors 172 that enable them to be programmably adjusted for use with stators having different stack heights Of course, the positions of the rear locking blades are fixed because the corresponding face of the stator is always located in the same vertical plane regardless of the stator stack height.

Figure 15:
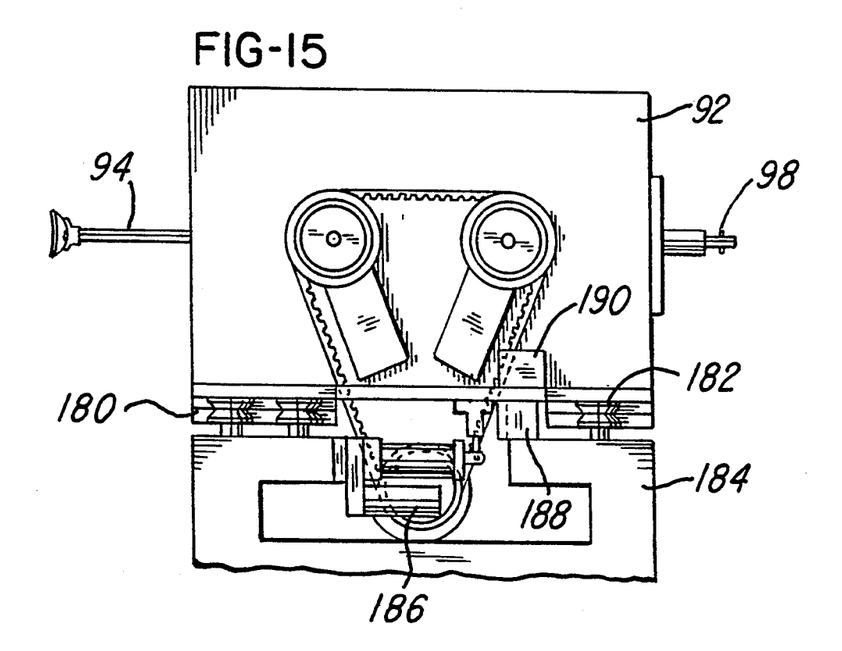
FIG. 15 is a fragmentary, rear elevational view of the programmably adjustable winding head assembly of this invention, representing the portion of the machine viewed in the direction of arrows 15—15 of FIG. 1.
Figure 16:
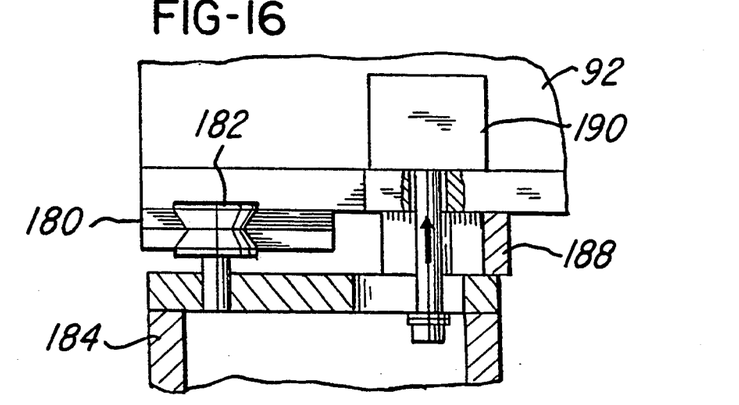
FIG. 16 is an enlarged, fragmentary elevational view showing the manner in which a winding head is clamped to its base.
Figures 17, 18, 19, 20, 21, 22:
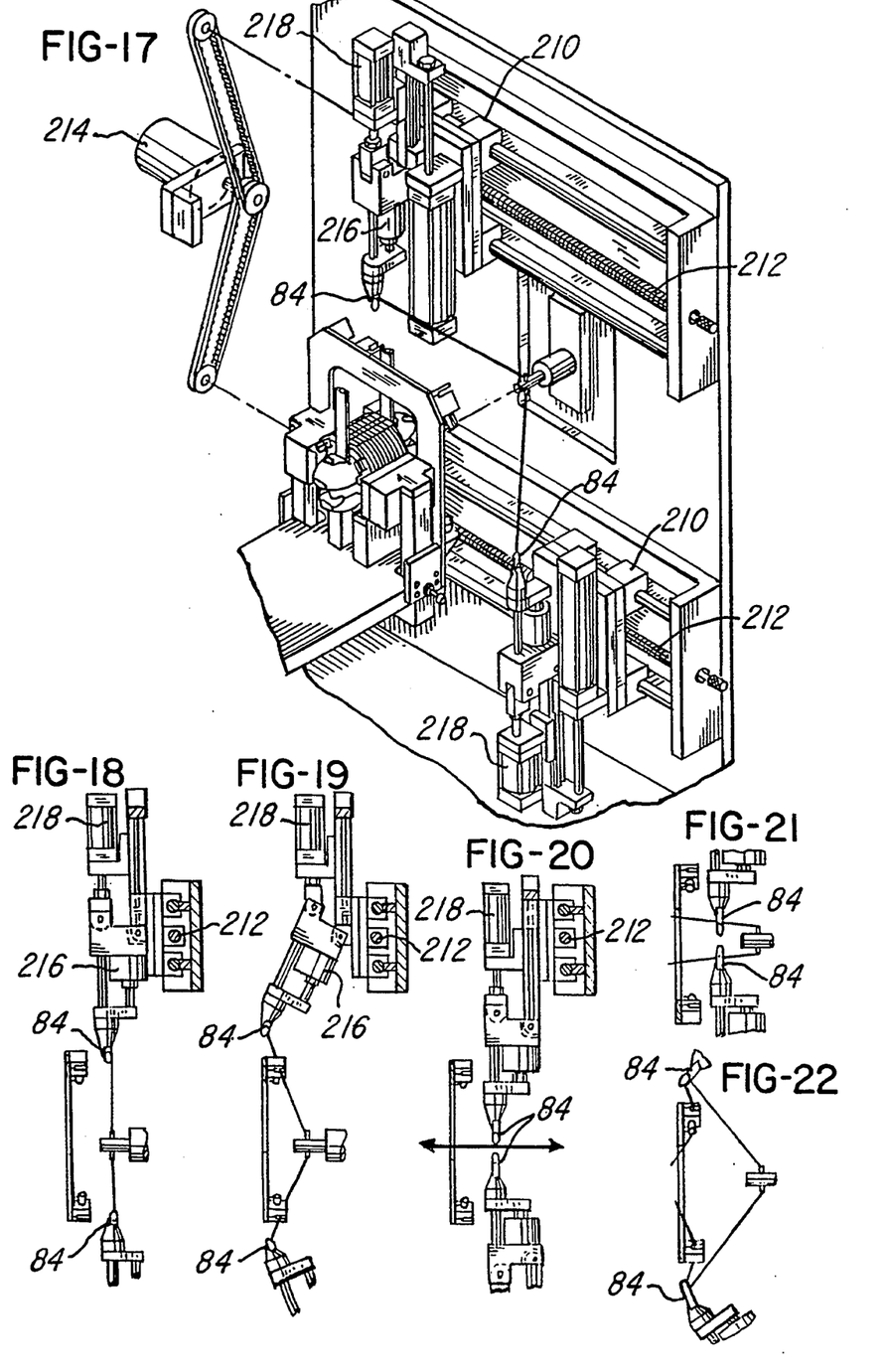
FIG. 17 is a fragmentary perspective view of a programmably adjustable lead pull assembly forming part of the machine of FIGS. 1 and 2. A small portion of this assembly is shown diagrammatically in FIG. 1 and is not shown in FIG. 2 to void overcrowding of lines.
FIGS. 18 through 22 diagrammatically illustrate the initial and final steps in the sequence of operation of the programmably adjustable lead pull assembly of FIG. 17.

With reference to FIGS. 1, 15, and 16, also for purposes of adjusting to stators having different stack heights, the winding head 92 has tracks 180 supported by roller elements 182 on a winding machine base 184. The entire winding head 92 may be moved toward and away from the stator, to advantageously adjust the center of the shuttle reciprocation to the center of the stator by means of a suitable drive unit 186. During the movement of the winding head 92, it also slides along a brass clutch member 188 shown in FIG. 16. To clamp the winding head in an adjusted location, a pair of air operated clamps 190 draw the winding head 92 and its base 184 together. The operating parts for moving and clamping the winding head 92 may also be programmably controlled for purposes of quick change over.

FIGS. 17 through 22 illustrate how the wire grippers 84 may be programmably controlled for winding stators having various different lead positioning requirements. There it will be noted that the wire grippers 84 are mounted on movable carriages 210 that are driven by screws 212 rotated by a motor 214 by which the carriage 210 is moved in opposite directions along the screws 212. Air actuators 216 and 218 on the carriages 210 are used to control the various movements of the lead pulls as illustrated in FIGS. 18 through 21. As known, cutting blades (not shown) mounted on the wire grippers 84 are used to sever the wire segments between the lead wire grippers 84 and the wound stator at the completion of the winding operation.

Although the presently preferred embodiment of this invention has been described, it will be understood that various modifications may be made within the scope of the following claims.

We claim:

1. Stator winding apparatus for winding field coils onto pole pieces of a stator located at a winding station using wires supplied from sources of wire under tension, said apparatus comprising:

a winding head assembly located adjacent said winding station that winds coils of wire on the stator at said winding station, said winding head assembly comprising a winding head having a ram that reciprocates and oscillates about a fixed horizontal axis, abase, means for supporting said winding head on said base for movement back and forth along said fixed horizontal axis, a motive device for moving said winding head along said fixed horizontal axis, means for clamping said winding head to said base to prevent movement thereof, and means for operating said clamping means to clamp said winding head in a fixed position on said base, so that the position of said winding head relative to said stator can be adjusted for stators having different stack heights.

2. In a method for winding stator field coils onto pole pieces of successive stators located at a winding station using wires supplied from sources of wire under tension, with the use of a winding head located adjacent said winding station that has a shuttle that reciprocates along and oscillates about a predetermined axis for winding coils of wire on stators at said winding station, the steps comprising:

mounting said winding head on a base for movement in the direction of said predetermined axis toward and away from the location of a stator to be wound when in said winding station, moving said winding head along said axis to adjust the center of shuttle reciprocation to the center of the cores of stators to be wound, and releasably clamping said winding head to said base.

3. Stator winding apparatus for winding field coils onto pole pieces of a stator located at a winding station using wires supplied from sources of wire under tension, said apparatus comprising:

a stator support at said winding station;

a winding head located adjacent said winding station that winds coils of wire on the stator on said support at said winding station, said winding head having a ram that reciprocates and oscillates about a fixed horizontal axis; and means for moving said winding head relative to said stator support along said fixed horizontal axis so that the position of said winding head relative to said stator can be adjusted for stators having different stack heights.

4. In the method for winding stator field coils onto pole pieces of successive stators located at a winding station using wires supplied from sources of wire under tension, with the use of a winding head located adjacent said winding station that has a shuttle that reciprocates along and oscillates about a predetermined axis for winding coils of wire on stators at said winding station, the steps comprising:

providing a stator support at said winding station; and moving said winding head relative to said stator support along said predetermined axis to adjust the center of shuttle reciprocation to the center of the cores of stators mounted on said support.

* * * * *